United States Patent [19]

Komatsu

[11] Patent Number: 4,698,797
[45] Date of Patent: Oct. 6, 1987

[54] OPTICAL TYPE INFORMATION REPRODUCING DEVICE

[75] Inventor: Hirotake Komatsu, Hamamatsu, Japan

[73] Assignee: Nippon Gakki Seizo Kabushiki Kaisha, Hamamatsu, Japan

[21] Appl. No.: 734,566

[22] Filed: May 15, 1985

[30] Foreign Application Priority Data

May 22, 1984 [JP] Japan ................................. 59-103007

[51] Int. Cl.$^4$ ................................................ G11B 7/00
[52] U.S. Cl. ...................................... 369/116; 369/106
[58] Field of Search ................... 369/106, 54, 58, 116; 250/202, 78

[56] References Cited

U.S. PATENT DOCUMENTS

| | | | |
|---|---|---|---|
| 4,114,180 | 9/1978 | Kayanuma | 369/106 |
| 4,150,402 | 4/1979 | Tietze et al. | 369/106 X |
| 4,162,398 | 7/1979 | Kamanuma | 369/106 X |
| 4,334,301 | 6/1982 | Kanamaru | 369/106 X |
| 4,570,251 | 2/1986 | Yokota et al. | 369/106 X |

OTHER PUBLICATIONS

Japanese Book Entitled, "Compact Disk Player for Beginners", pp. 42-45 (first published 7/20/83).

Primary Examiner—Aristotelis M. Psitos
Attorney, Agent, or Firm—Spensley Horn Jubas & Lubitz

[57] ABSTRACT

An optical type information reproducing device for playing back a laser disc comprises a laser beam source for projecting laser beam on the laser disc, a pickup and signal processing circuit for receiving the laser beam reflected from or transmitted through the disc and performing photo-electric conversion and signal processings and outputting a reproduced signal, and a laser beam source control circuit responsive to the level of the laser beam received by the pickup and signal processing circuit for controlling the level of the laser beam. By detecting the level of the laser beam reflected from or transmitted through the disc and controlling the laser beam output in response to the detected value, the level of the reflected or transmitted laser beam is maintained at a constant value.

6 Claims, 6 Drawing Figures

OPTICAL TYPE INFORMATION REPRODUCING DEVICE

BACKGROUND OF THE INVENTION

This invention relates to an optical type information reproducing device for laser discs such as a compact disc of the Compact Disc Digital Audio System and a video disc and, more particularly, to a device of such type capable of controlling a laser beam output of a laser pickup so as to maintain the level of a reflected or transmitted laser beam at a constant value.

In an optical type disc playback device, an original signal is reproduced by shaping the waveform of a high-frequency signal reproduced from a disc at a predetermined threshold level. For eliminating an error in reading information recorded on a disc, therefore, it is important to maintain the level of the high-frequency reproduced signal at a constant value.

The construction of a prior art optical type information reproducing device (optical type digital audio disc playback device such as a Compact Disc playback device) is shown in FIG. 1. In FIG. 1, a laser pickup 10 includes a semiconductor laser 12, PIN diodes 14 for reproducing a signal and a laser output detecting PIN diode 15 for monitoring an output level of the laser 12. Laser beam 16 projected from the semiconductor laser 12 is reflected by a disc 18 and received by the diodes 14. An output signal of the diodes 14 is applied through a high-frequency amplifier 20 to a level adjusting resistor 22 in which an output signal of the amplifier 20 is adjusted in its level. An output signal of the level adjusting resistor 22 is applied to an audio signal reproducing circuit 24 for reproduction processings such as digital-to-analog conversion and thereafter is outputted as an audio signal.

The diode 15 receives laser beam 16' outputted from the semiconductor laser 12 and applies a laser signal responsive to the laser beam 16' to a laser power control circuit 26. The laser power control circuit 26 is provided with a power voltage −V and functions to maintain the laser beam output from the laser 12 at a constant level by controlling a voltage (i.e., ∝ operation current) applied to the semiconductor laser 12 in response to the laser signal derived from the diode 15. This constant level is set by an output setting variable resistor 28.

The optical type information reproducing device as shown in FIG. 1 is disadvantageous in that it cannot cope with fluctuation in the level of the high-frequency reproduced signal due to irregularity of the disc surface since the control of the laser beam output in this type of device is made on the basis of detection of the laser beam 16' by the monitoring diode 15 and not on the basis of detection of reflected laser beam from the disc 18. Besides, this prior art device requires the diode 15 provided exclusively for the control of the laser beam output with a resulting complicated structure of the device and high manufacturing cost. It is also a disadvantage of the device that, since the high-frequency signal reproducing system and the laser output control system are separated from each other, adjusting of the level of the reproduced signal against irregularities of the laser pickup 10 and relating circuits is required and for this purpose, the level adjusting resistor 22 must be provided.

SUMMARY OF THE INVENTION

It is, therefore, an object of the invention to eliminate the above described disadvantages of the prior art device by providing an optical type information reproducing device which has obviated an element used exclusively for detecting the laser beam output and is capable of maintaining the level of a reproduced high-frequency signal at a constant value regardless of irregularities of the laser pickup, replating circuits and disc.

According to the invention, the level of laser beam projected from the laser pickup and reflected from or transmitted through a recording medium is detected and the output of the laser beam is controlled in response to the detected value to maintain the level of the reflected or transmitted laser beam at a constant value.

DESCRIPTION OF THE DRAWINGS

In the accompanying drawings.

DESCRIPTION OF PREFERRED EMBODIMENTS

Figure 1:
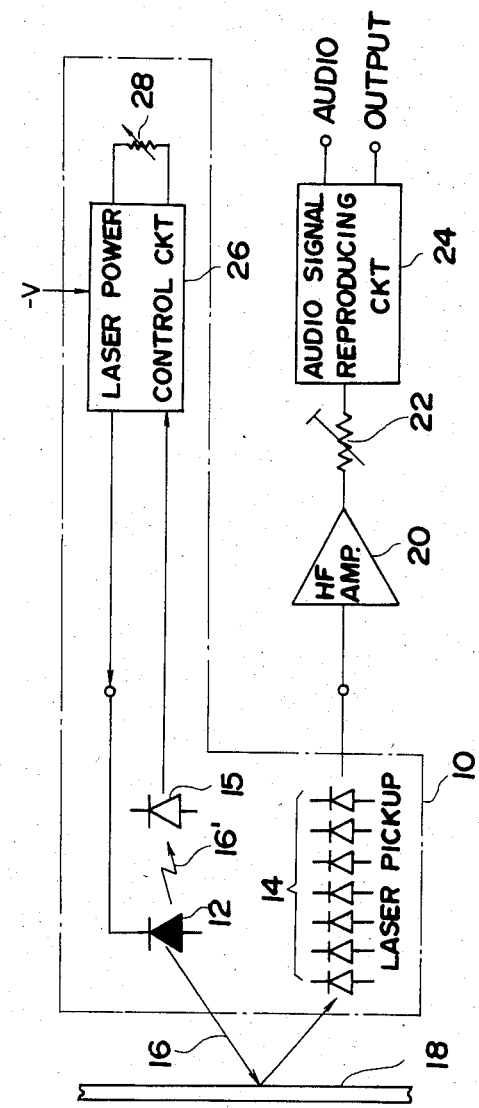
FIG. 1 is a block diagram showing an example of the prior art device.
Figure 2:
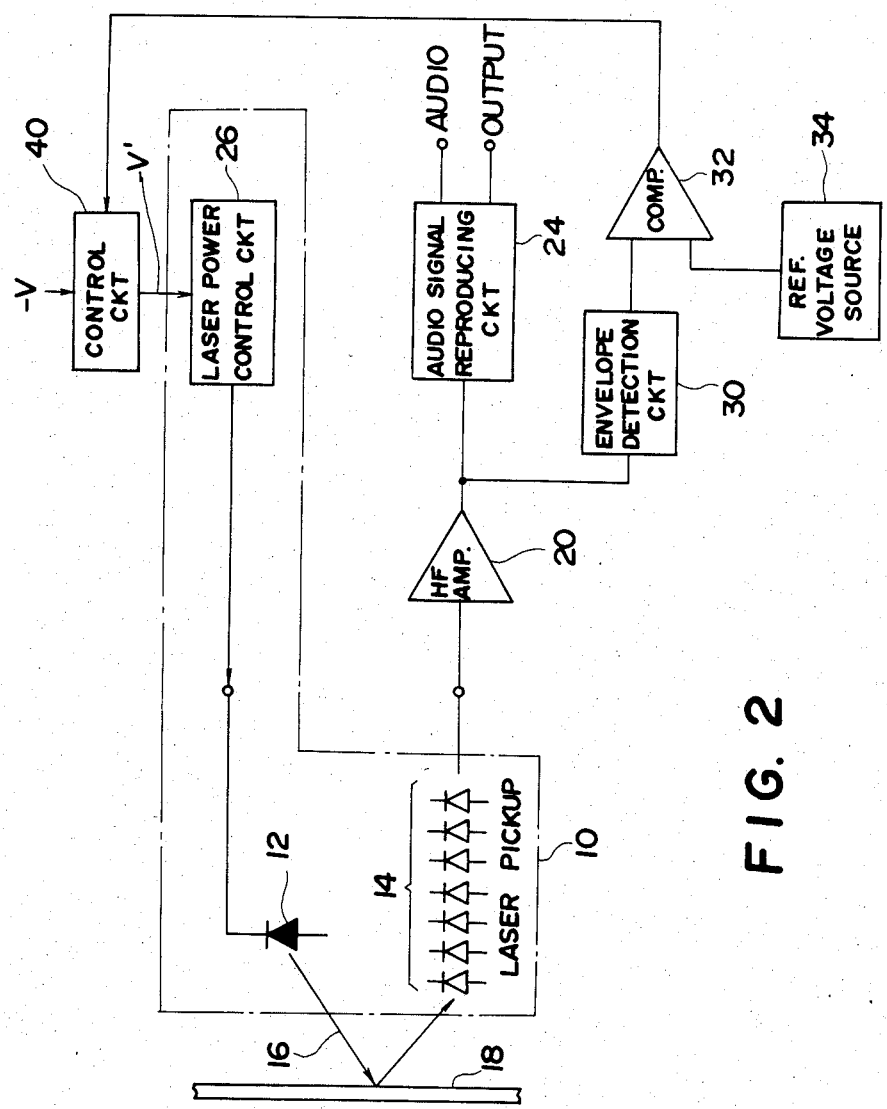
FIG. 2 is a block diagram showing an embodiment of the optical type information reproducing device (optical type digital audio disc playback device) according to the invention.

An embodiment of the invention is shown in FIG. 2. In this embodiment, the same component parts as those of the prior art device shown in FIG. 1 are designated by the same reference characters.

Referring to FIG. 2, a laser pickup 10 includes a semiconductor laser 12 and a plurality of signal reproducing PIN diodes 14. Laser beam 16 outputted from the semiconductor laser 12 is reflected on a disc 18 and then received by the diodes 14. A laser signal outputted by the diodes 14 is applied to an audio signal reproducing circuit 24 through a high-frequency amplifier 20 and is subjected to reproduction processings such as digital-to-analog conversion and thereafter is outputted as an audio signal.

The output of the high-frequency amplifier 20 is applied also to an envelope detection circuit 30 where the envelope of the high-frequency reproduced signal, i.e., the signal level of the high-frequency reproduced signal is detected. The detected envelope signal is applied to a comparator 32 where it is compared with a reference level set by a reference voltage source 34. A result of comparison by the comparator 32 is applied to a control circuit 40 to control a power voltage −V' applied to a laser power control circuit 26 thereby to control the level of the laser beam output at a constant value. The value of the constant level is set by the voltage of the reference voltage source 34. The control circuit 40 is supplied with a power voltage −V, and the voltage −V is controlled to develop the power voltage −V'.

According to the above embodiment, when the high-frequency reproduced signal tends to fluctuate due to the irregularity of the disc 18 which has occurred in the manufacturing process, the laser beam output is automatically increased or decreased in response to such fluctuation so that the high-frequency reproduced signal is maintained at a constant value and thus reproduction of accurate information substantially free from the reading error can be realized. Besides, since the laser output control system and the information reproducing system are constructed in an integral loop in this embodiment, the adjustments as in the prior art circuit against the irregularities of the laser pickup 10 and the relating circuits are unnecessary.

Figure 3:
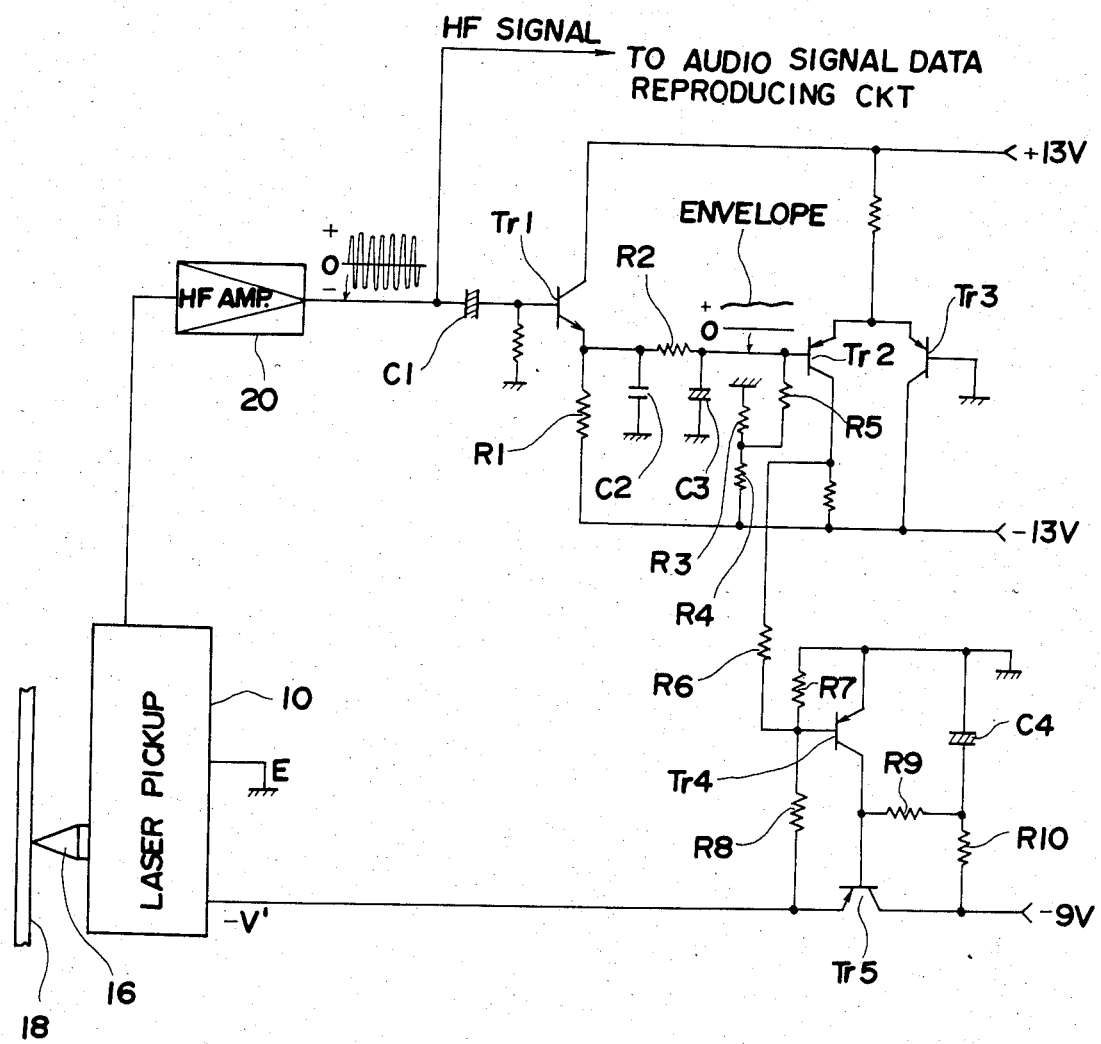
FIG. 3 is a circuit diagram showing a specific example of the device shown in FIG. 2.

A specific example of the optical type information reproducing device of FIG. 2 is shown in FIG. 3. In FIG. 3, the high-frequency reproduced signal derived from the disc 18 by the laser pickup 10 is applied to the audio signal reproducing circuit 24 through the high-frequency amplifier 20. The output of the high-frequency amplifier 20 is also applied to the base of a transistor Tr1 through a coupling capacitor C1. The transistor Tr1 functions to take out the envelope of the high-frequency reproduced signal. More specifically, the transistor Tr1 is connected at its collector to a power voltage source of +13V and at its emitter to a power voltage source of −13V through an emitter resistor R1. A capacitor C2 is connected between this emitter and the ground. Accordingly, when the waveform of the high-frequency reproduced signal is on the positive side of its cycle, the transistor Tr1 is turned on and the capacitor C2 is rapidly charged whereas when the waveform of the high-frequency signal is on the negative side, the transistor Tr1 is turned off and the charge of the capacitor C2 is discharged gradually through the emitter resistance (with high resistance value). Accordingly, a voltage corresponding to the envelope of the positive side of the high-frequency reproduced signal is constantly produced in the capacitor C2. The voltage of the capacitor C2 is further smoothed by a time constant circuit consisting of a resistor R2 and a capacitor C3 (a circuit having a time constant which is larger than a time constant of the time constant circuit consisting of the resistor R1 and the capacitor C2). The envelope signal thus obtained is applied to the base of a transistor Tr2. The transistor Tr2 is provided with a negative bias at its base by resistors R3, R4 and R5 and constitutes a differential amplifier together with a transistor Tr3. The collector output of the transistor Tr2 is applied to the base of a transistor Tr4 through a resistor R6. This resistor R6 may be substituted by a diode whose anode is connected to the base of a transistor Tr4. The transistor Tr4 is provided with bias at its base by resistors R7 and R8, its emitter being grounded and its collector being connected to the base of a transistor Tr5. The base of the transistor Tr5 in turn is connected to a power voltage source of −9V through a base current path consisting of resistors R9 and R10 and a capacitor C4. The collector of the transistor Tr5 is connected to the power voltage source of −9V and its emitter output is connected to a power input terminal −V' of the laser pickup 10 as a control voltage.

If, accordingly, the level of the high-frequency reproduced signal has exceeded a set level, the level of the envelope signal applied to the transistor Tr2 rises and so the collector voltage of the transistor Tr2 rises in the negative direction. The collector current of the transistor Tr4 thereby increases resulting in increase of the current flowing through the resistors R9 and R10. The base current of the transistor Tr5 therefore decreases causing the emitter-collector impedance to increase and the emitter voltage of the transistor Tr5 to approach the ground level. This causes the power input terminal voltage of the laser pickup 10 (i.e., the voltage between the ground and the emitter of the transistor Tr5) to decrease with a result that the laser beam output decreases and the level of the high-frequency reproduced signal falls to the set level.

If, on the contrary, the level of the high-frequency reproduced signal falls below the set level, the level of the envelope signal applied to the transistor Tr2 falls and the collector voltage of the transistor Tr2 decreases in the negative direction. The collector current of the transistor Tr4 thereby decreases causing the current flowing through the resistors R9 and R10 to decrease. This in turn causes the base current of the transistor Tr5 to increase with a result that the emitter-collector impedance decreases and the emitter voltage of the transistor Tr5 recedes from the ground level. The power voltage of the laser pickup 10 thereby increases and the laser beam output increases so that the level of the high-frequency reproduced signal increases up to the set level. In the above described manner, the level of the high-frequency reproduced signal is controlled at a constant value.

Figure 4:
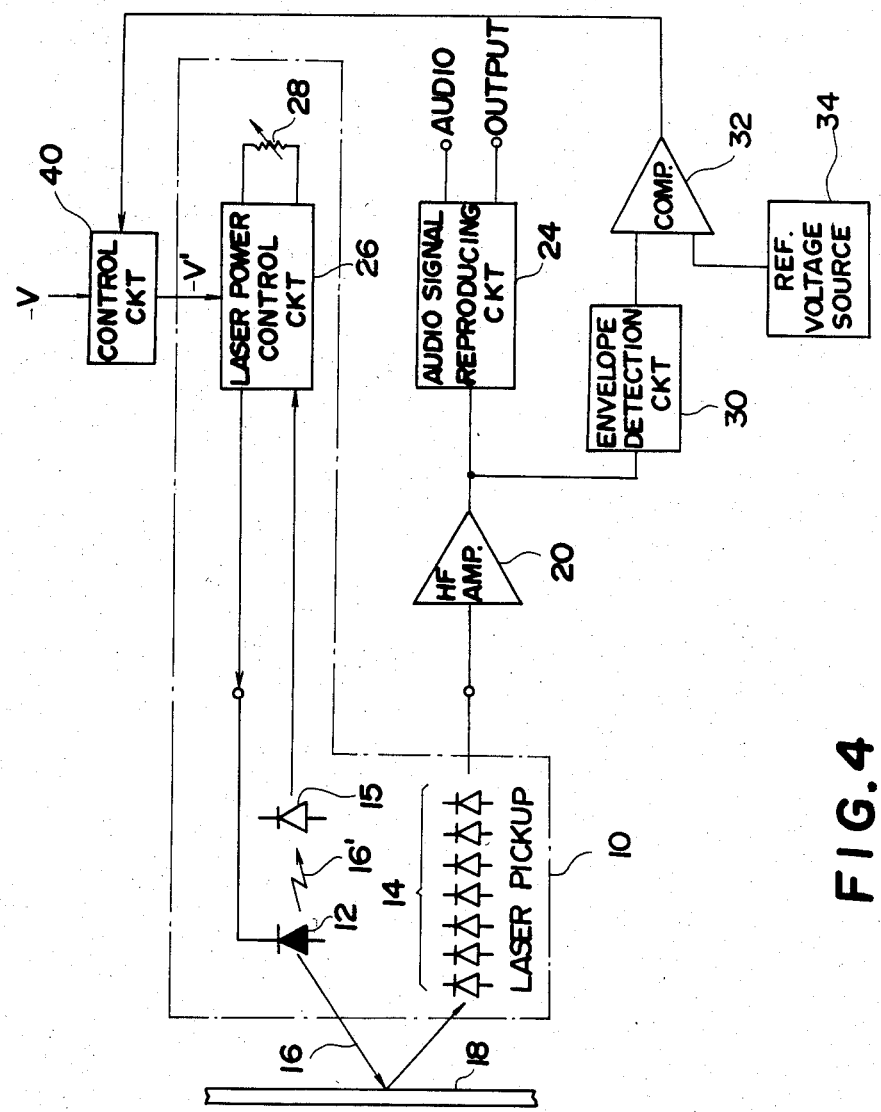
FIG. 4 is a block diagram showing another embodiment of the invention.

FIG. 4 shows another embodiment of the invention. This embodiment is a combination of the control of the embodiment shown in FIG. 2 and the control of the prior art device as shown in FIG. 1. According to this embodiment, the prior art type control is constituted as a local loop and the control shown in FIG. 2 is constituted as an overall loop. The control is basically effected by the overall loop and the upper limit of the operation current of the semiconductor laser is controlled by the local loop. In the embodiment of FIG. 4, the same components as those in FIGS. 1 and 2 are designated by the same reference characters.

In FIG. 4, a laser pickup 10 includes a semiconductor laser 12, signal reproducing PIN diodes 14 and a laser output detecting PIN diode 15. Laser beam 16 projected from the semiconductor laser 12 is reflected on a disc 18 and received by the diodes 14. A laser signal outputted by the diodes 14 is applied to an audio signal reproducing circuit 24 through a high-frequency amplifier 20 and is subjected to reproduction processings such as digital-to-analog conversion and thereafter is outputted as an audio signal.

The output of the high-frequency amplifier 20 is also applied to an envelope detection circuit 30 where the envelope of the high-frequency reproduced signal, i.e., the signal level of the high-frequency reproduced signal is detected. The detected envelope signal is applied to a comparator 32 where it is compared with a reference level set by a reference voltage source 34. The result of comparison by the comparator 32 is applied to a control circuit 40 to control a power voltage −V' applied to a laser power control circuit 26.

The PIN diode 15 receives laser beam 16' projected from the semiconductor laser 12 and supplies a laser signal to the laser power control circuit 26. The laser power control circuit 26 is applied with the power voltage −V' and controls the voltage supplied to the semiconductor laser 12 so that the laser beam output becomes a value set by an output setting variable resistor 28. In this embodiment, an operating voltage applied to the laser 12 through the laser power control circuit 26 in response to the power voltage −V' is set at a value which is lower than an upper limit operating voltage applied to the laser 12 set by the output setting variable resistor 28. By this arrangement, the laser beam output is normally controlled by the overall loop based on the output of the comparator 32 using the reference level set by the reference voltage source 34. In addition, the upper limit value of the laser beam output is controlled by the local loop by the laser power control circuit 26 using the reference level set by the output setting variable resistor 28.

Figure 5:
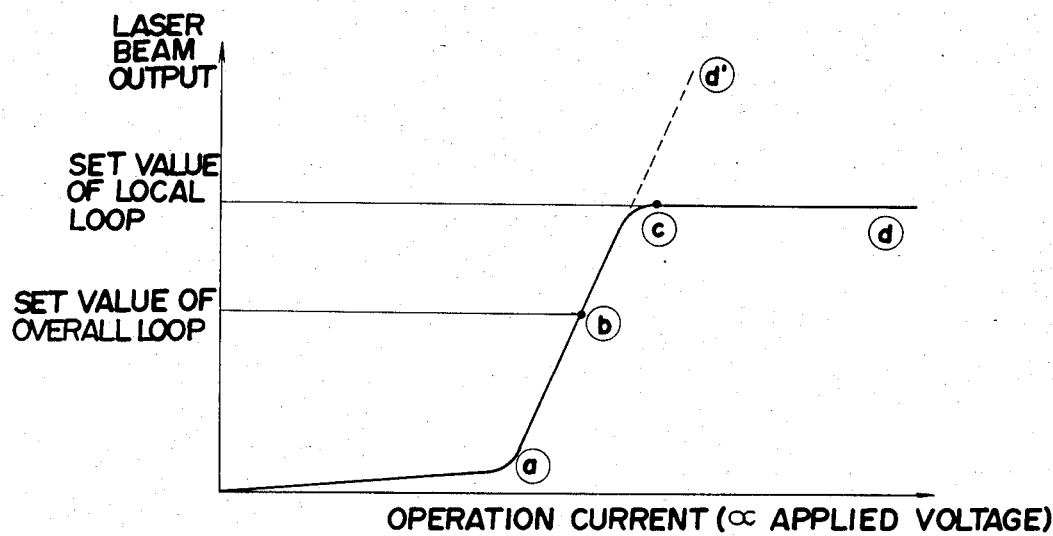
FIG. 5 is a diagram for explaining the operation of the device shown in FIG. 4.

The operation of the device shown in FIG. 4 is shown in FIG. 5 in which the horizontal axis represents an operation current of the laser 12 ($\propto$ applied voltage to the laser 12) and the vertical axis a laser beam output magnitude. In a case where no control is performed either by the overall loop or by the local loop, the laser beam output linearly increases with increase of the operation current in the direction of a→b→c→d'. The local loop operates to restrict the upper limit value of the laser beam output in such a manner that the laser beam output changes in the direction of a→→b→c→d with increase of the operation current, being restricted at the upper limit value in a range of c-d. In the control employing the prior art local loop only, the laser beam output is maintained at a constant level by using this range of c-d. In contrast, the overall loop uses the range of a-c, and a control point is set at b within this range.

Thus, by combining the local loop and the overall loop together, the control range is expanded to the range of a-d, the control being normally effected at the point b by the overall loop and the upper limit being controlled in the range of c-d by the local loop.

According to this, the control is normally performed at the point b in contrast to the control by the local loop only which is operated in the range of c-d so that the operation current is reduced as compared with the control by the local loop only and the power consumption thereby is saved. Moreover, generation of heat can be held at an extremely low level.

Figure 6:
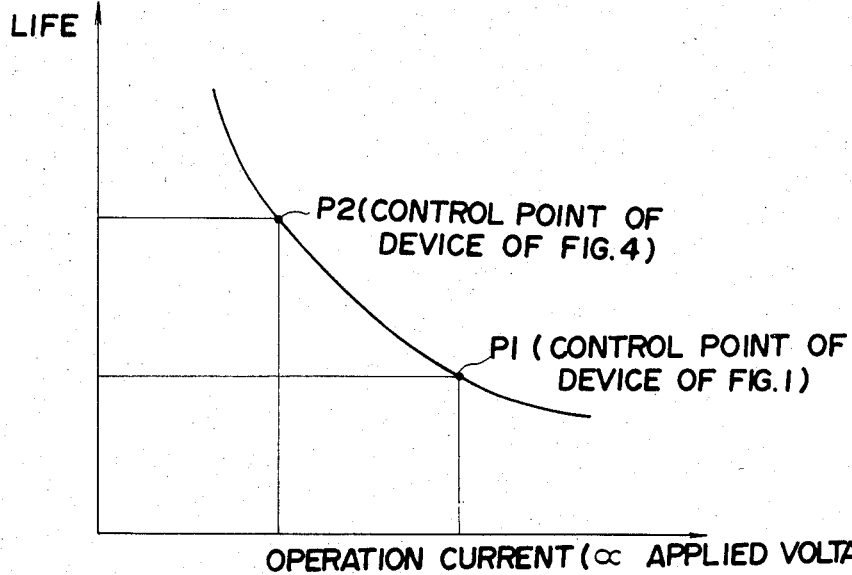
FIG. 6 is a graph showing relationship between the operation current of the semiconductor laser and the life of the semiconductor laser.

The relationship between the operation current of the semiconductor laser and its life is characterized in that, as shown in FIG. 6, the life is prolonged if a small operation current is used whereas the life is shortened if a large operation current is used. In the prior art control by the local loop only as shown in FIG. 1, the control point is set at a point such as P1 at which a large operation current is used with a resulting short life of the semiconductor laser. In contrast, the control by the embodiment of FIG. 4 is so performed that the control point is set at a point P2 at which the operation current is small and, accordingly, the semiconductor laser can enjoy a long life.

The present invention is applicable to both three-beam type and one-beam type laser pickups. In the case the invention has been applied to one-beam type laser pickup, the maintaining of the level of the high-frequency reproduced signal at a constant value causes the level of a tracking control signal to be maintained at a constant value so that the invention is effective in improving the characteristics of the tracking control.

The above described embodiments are ones in which the present invention has been applied to a reproducing device using a laser reflecting type disc. The invention is not limited to this but it may be applied to a device using a laser transmitting type disc.

As will be apparent from the above description, it is a feature of the invention to detect the level of the laser beam projected from the laser pickup and reflected from or transmitted through a recording medium and utilize the detected signal for controlling the laser beam output. By this arrangement, an element used exclusively for detecting the laser beam output can be obviated and the level of the high-frequency reproduced signal can be maintained at a constant value regardless of the irregularities of the laser pickup, the relating circuits and the discs. Accordingly, reproduction of signals from a disc with a scratch can be improved and an error in reading recorded information can be eliminated. Besides, the construction in which the laser output control system and the information reproduction system are constituted in an integral loop obviates adjustments against irregularities of the laser pickup and the relating circuits required in the prior art device. Further, by applying the present invention to a one-beam type laser pickup, the level of a tracking control signal also be maintained at a constant value so that the accuracy of the tracking control can be improved.

What is claimed is:

1. An optical type information reproducing device for optically reproducing information recorded on a disc, comprising:
    a laser beam source for projecting a reproducing laser beam on said disc;
    a pickup and signal processing circuit for receiving the laser beam projected by said laser beam source via said disc, performing photoelectric conversion and signal processings with respect to the received laser beam and outputting a reproduced signal;
    a laser beam source control circuit responsive to the level of the laser beam received by said pickup and signal processing circuit for controlling the level of the reproducing laser beam projected on said disc from said laser beam source so as to maintain the level of the laser beam received by said pickup and signal processing circuit at a constant value; and
    a laser beam source output detector for detecting the level of the laser beam being projected on said disc from said laser beam source,
    said laser beam source control circuit being further controlled by the detection output of said laser beam source output detector so as to limit the level of the laser beam being projected on said disc to a maximum value.

2. An optical type information reproducing device as defined in claim 1 wherein said pickup and signal processing circuit comprises:
    a laser pickup for receiving the laser beam projected on said disc from said laser beam source via said disc and outputting an electrical signal in accordance with the received laser beam;
    a high-frequency amplifier for amplifying the output of said laser pickup;
    an envelope detection circuit for detecting an envelope of the output of said high-frequency amplifier; and
    a comparator for comparing the output of said envelope detection circuit with a reference voltage of a predetermined value and supplying a result of the comparison to said laser beam source control circuit for effecting the control of the level of the laser beam projected on said disc from said laser beam source.

3. An optical type information reproducing device as defined in claim 2 wherein the laser beam source control circuit includes means for controlling the level of the laser beam projected on said disc from said laser beam source in response to the result of the comparison outputted by said comparator when the laser beam output is below an upper limit value and means for controlling the upper limit value in response to the detection output of said laser beam source output detector.

4. An apparatus for reproducing information recorded on a prerecorded optical disc, comprising:
- a laser beam source for projecting a laser beam onto the disc;
- a pickup and signal processing circuit for receiving the laser beam projected by the laser beam source via the disc, performing photoelectric conversion and signal processing with respect to the received laser beam and outputting a reproduced signal;
- laser beam source control means for:
  - (a) monitoring the level of the laser beam received by the pickup and signal processing circuit; and
  - (b) controlling the level of the projected laser beam in response to the monitored level to maintain the monitored level at a substantially constant value; and
- a laser beam source output detector for detecting the level of the laser beam being projected onto the disc from the laser beam source, wherein the laser beam source control means further includes means responsive to the laser beam source output detector for limiting the maximum output of the laser beam source to a predetermined level.

5. An apparatus as in claim 4 wherein the laser beam source control means includes means for providing a linearly variable drive voltage to the laser beam source.

6. An apparatus as in claim 4 wherein the laser beam source control means includes:
- a laser power control circuit for receiving a power voltage and maintaining the level of the laser beam being projected on the disc at said predetermined level in response to receipt of a maximum power voltage; and
- an applied voltage control circuit for controlling the power voltage applied to the laser power control circuit in response to the monitored level of the laser beam received by the pickup and signal processing circuit thereby to vary the level of the projected laser beam below the predetermined level and maintain the monitored level at a substantially constant value.

* * * * *